United States Patent [19]

Honjo et al.

[11] Patent Number: 4,667,116
[45] Date of Patent: May 19, 1987

[54] INVERTER CONTROL CIRCUIT

[75] Inventors: Kenji Honjo; Tooru Nakamura, both of Hyogo, Japan

[73] Assignee: Mitsubishi Denki Kabushiki Kaisha, Tokyo, Japan

[21] Appl. No.: 793,117

[22] Filed: Oct. 30, 1985

[30] Foreign Application Priority Data

Oct. 31, 1984 [JP] Japan ................................ 59-229574

[51] Int. Cl.$^4$ ................................................ H02J 9/00
[52] U.S. Cl. ........................................ 307/64; 307/66; 307/87; 363/79
[58] Field of Search ........................ 307/64, 66, 72, 73, 307/75, 82, 85, 86, 87; 363/74, 79, 95, 96

[56] References Cited

U.S. PATENT DOCUMENTS

| | | |
|---|---|---|
| 3,515,895 | 6/1970 | Bratton ................................ 307/64 |
| 3,612,894 | 10/1971 | Schmidt ............................ 306/64 X |
| 3,805,139 | 4/1974 | Hoffman ............................ 307/66 X |
| 3,991,319 | 11/1976 | Servos et al. ........................... 307/64 |
| 3,999,077 | 12/1976 | Borkovitz et al. ..................... 307/66 |
| 3,999,078 | 12/1976 | Udvardi-Lakos ...................... 307/66 |
| 4,010,381 | 3/1977 | Fickenscher et al. ................. 307/66 |
| 4,065,711 | 12/1977 | Kawabata ......................... 307/66 X |
| 4,195,233 | 3/1980 | Udvardi-Lakos ...................... 307/66 |
| 4,238,691 | 12/1980 | Ebert ...................................... 307/66 |
| 4,241,261 | 12/1980 | Ebert ................................ 307/64 X |

OTHER PUBLICATIONS

Japan Telecommunication Review vol. 22, No. 4, (Oct. 1980).
Shiro Doi et al., *Journal OHM*, Jun. 1983 Issue, "Uninterruptible Power Supply (CVCF) System and Influence Countermeasure", pp. 20-23.

Primary Examiner—William M. Shoop, Jr.
Assistant Examiner—Shik Luen Paul Ip
Attorney, Agent, or Firm—Bernard, Rothwell & Brown

[57] ABSTRACT

An inverter control circuit for a power supply source comprising an inverter and a commercial power source (reserve power source) and adapted to connect the inverter normally to a load and to change the inverter with the commercial power source uninterruptedly by means of a thyristor switch to supply power uninterruptedly to the load in case the inverter malfunctions. The inverter control circuit comprises a digital PLL circuit for synchronism control, a bias signal, and a parallel connection of a synchronism control circuit and a synchronism detecting circuit, and is capable of uniterruptedly changing the inverter to the commercial power source by being switched to biasing signals by means of the switch at the timing of the synchronism detecting of the synchronism detecting circuit in case the synchronism control circuit malfunctions.

3 Claims, 5 Drawing Figures

INVERTER CONTROL CIRCUIT

BACKGROUND OF THE INVENTION

Field of the Invention

The present invention relates to an inverter control circuit for controlling an operation of transferring the power from an inverter to a reserve power source.

Description of the Prior Art

A conventional inverter control circuit for such a purpose as shown in FIG. 1 has been proposed. In FIG. 1, there are shown an inverter 1, a commercial power source 2 (reserve power source), thyristor switches 3 and 4, a load 5, a crystal oscillator 11, an inverter voltage control circuit 12, Schmitt trigger circuits 21 and 22, a phase difference sensing circuit 23, a control amplifier 31, a condenser 32, a V/F converter 51, and a pulse adder-subtracter circuit 52. The Schmitt trigger circuits 21 and 22, the phase difference sensing circuit 23, the control amplifier 31 and the condenser 32 constitute a synchronism control circuit S. In FIG. 1, a symbol $\phi$ indicates a voltage phase difference signal.

The manner of operation of the conventional inverter control circuit of FIG. 1 will be described hereinafter.

FIG. 2 shows a mode of a phase difference signal $\phi$ provided by the voltage phase difference sensing circuit 23 during the operation of the Schmitt trigger circuits 21 and 22 and the phase difference sensing circuit 23. A voltage phase difference $\phi_1$ at a time $t_0$ is reduced to zero at a time $t_1$ by the operation of a digital PLL (Phase Locked Loop) including the inverter voltage control circuit 12, the V/F converter 51 and the pulse adder-subtracter circuit 52. Thereafter, the phase difference remains zero as long as the voltages do not change suddenly. When a trouble occurs in the inverter 1 in such an operating state, the thyristor switches 3 and 4 are controlled so as to transfer the load 5 uninterruptedly from the inverter 1 to the commercial power source 2.

At the same time, the frequency of the digital PLL circuit is converted into a pulse frequency corresponding to a control signal provided by the control amplifier 31 to the V/F converter 51. The converted pulse frequency is added to or subtracted from a reference oscillation pulse frequency of the crystal oscillator 11 by the pulse adder-subtracter circuit 52. The output frequency of the inverter 1 is controlled by giving the output pulse signal of the adder-subtracter circuit 52 to the inverter voltage control circuit 12 as a clock signal.

When a trouble occurs in the synchronism control circuit, the above-mentioned conventional inverter control circuit is unable to synchronize the inverter with the commercial power source. Accordingly, in repairing the synchronism control circuit, the power source should be transferred at once from the inverter to the commercial power source. But since this transfer operation is to have a short break of power because of non-synchronism operation, non-interrupting the operation of the load is impossible.

SUMMARY OF THE INVENTION

It is the primary object of the present invention to provide a useful inverter control circuit eliminated of the disadvantages of the conventional inverter control circuit.

It is another object of the present invention to provide an inverter control circuit capable of transferring power source uninterruptedly from an inverter to a commercial power source when a trouble occurs in the synchronism control circuit of the inverter control circuit.

It is a further object of the present invention to provide an inverter control circuit capable of enabling the maintenance, inspection and repair of the control circuit of a no-break power unit or the like, in which service interruption should not occur.

These and other objects, features and advantages of the present invention will become more apparent from the following detailed description of a preferred embodiment thereof taken in connection with the accompanying drawings.

DESCRIPTION OF THE PREFERRED EMBODIMENT

Figure 3:
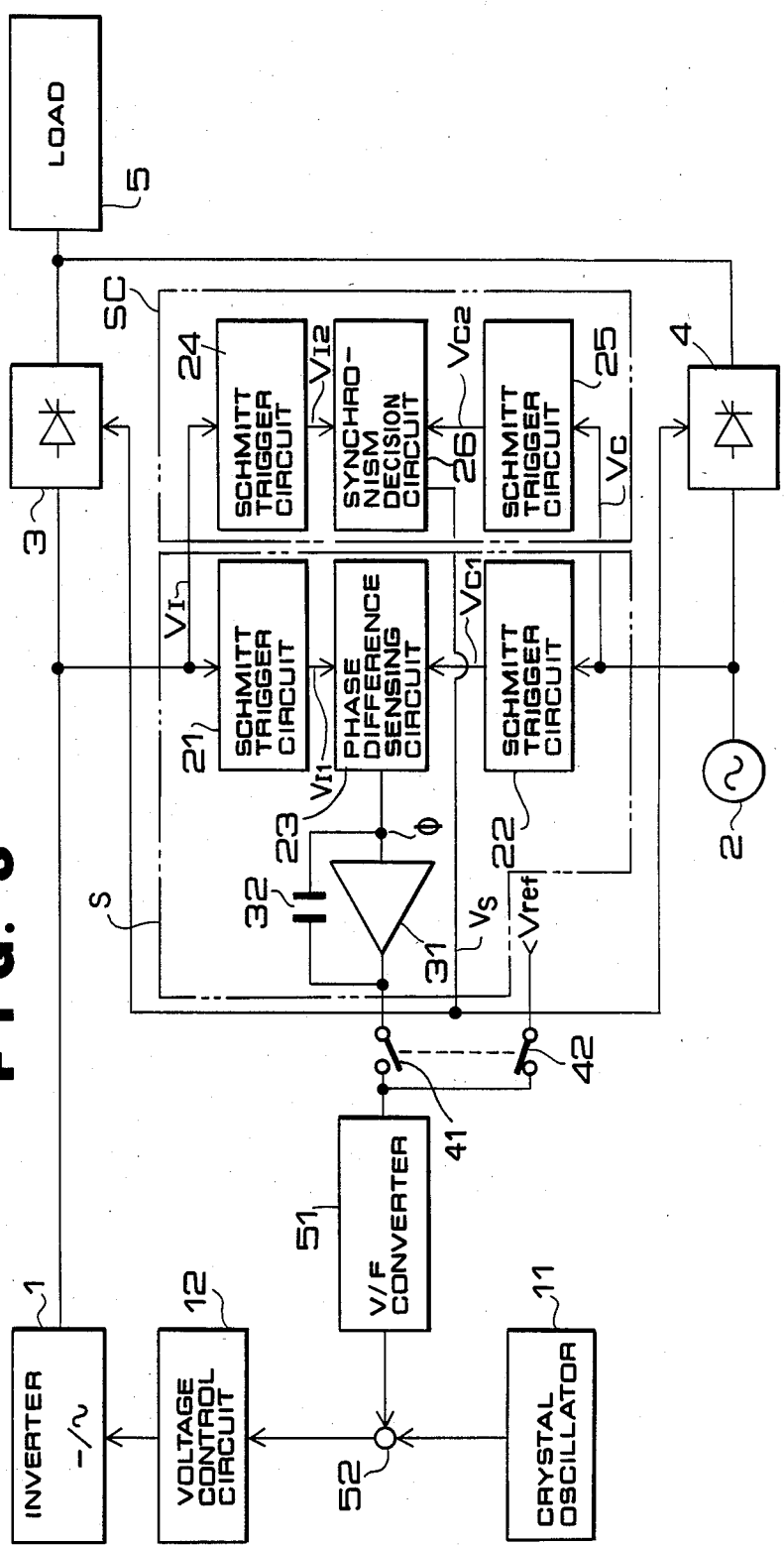
FIG. 3 is a block diagram of an inverter control circuit, in a preferred embodiment, according to the present invention.

FIG. 3 is a block diagram of a preferred embodiment of the present invention. In FIG. 3, there are shown Schmitt trigger circuits 24 and 25, a synchronism decision circuit 26, switches 41 and 42, a bias signal $V_{ref}$, an inverter output voltage $V_I$, a commercial power supply voltage $V_C$, voltage signals $V_{I1}$ and $V_{I2}$, and $V_{C1}$ and $V_{C2}$, namely, shaped voltage signals produced by shaping the respective waveforms of the inverter output voltage $V_I$ and the commercial power supply voltage $V_C$, respectively, and a voltage signal $V_S$ provided after synchronism detecting.

Figure 4A:
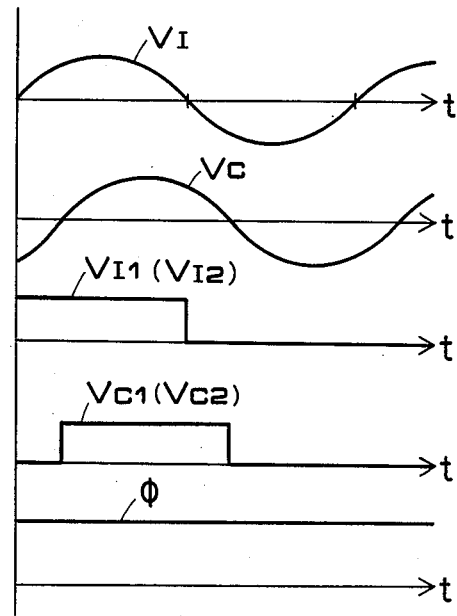
FIGS. 4A and 4B are waveform charts of assistance in explaining the operation of the inverter control circuit of FIG. 3.
Figure 4B:
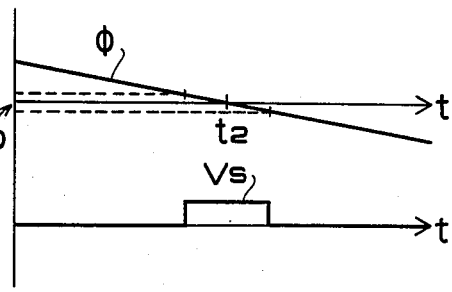

FIGS. 4A and 4B illustrate the waveforms of the signals provided during the operation of the inverter control circuit of the present invention.

Figure 1:
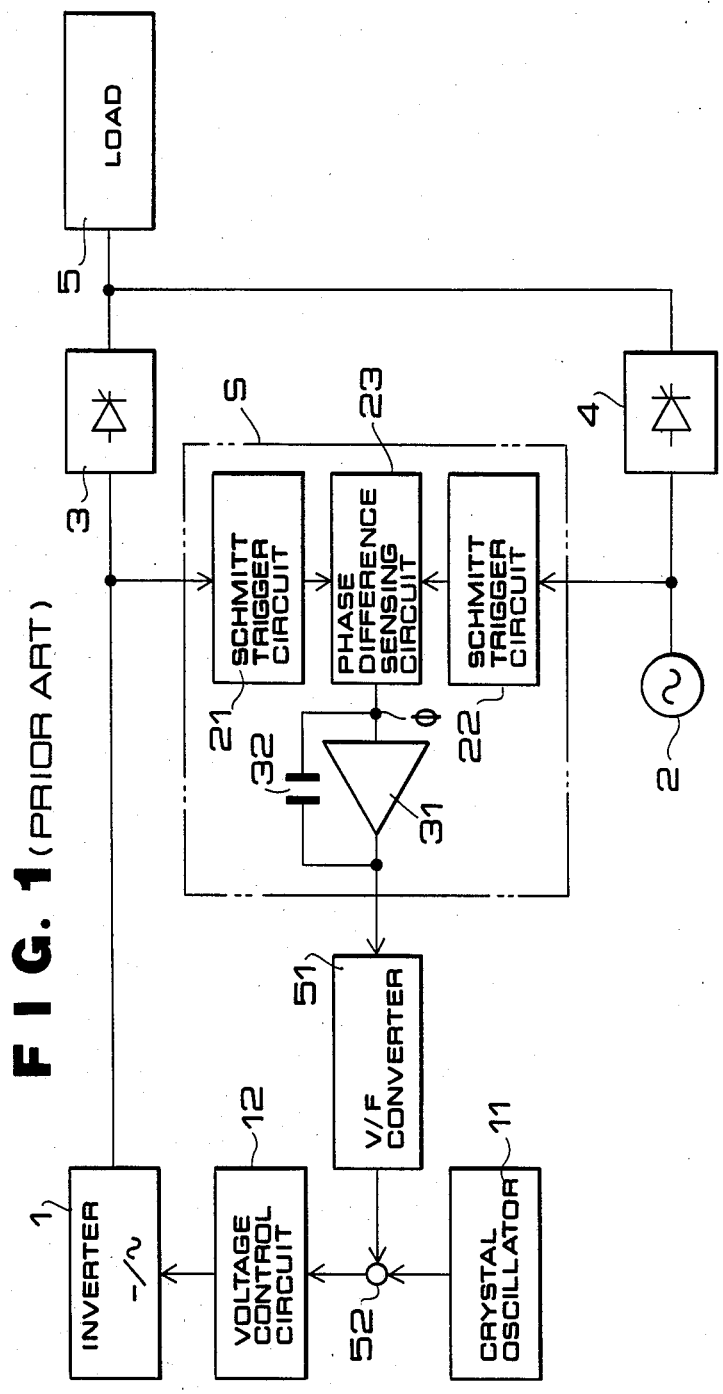
FIG. 1 is a block diagram of a conventional inverter control circuit.
Figure 2:
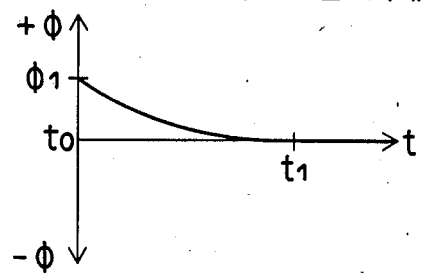
FIG. 2 is a graph of assistance in explaining the operation of the inverter control circuit of FIG. 1.

In FIGS. 1 and 3, like reference characters designate like or corresponding parts.

If any one of the component circuit, namely, Schmitt trigger circuits 21 and 22, a phase difference sensing circuit 23, a control amplifier and a condenser 32, of a synchronism control circuit S fails to function properly, the synchronism control circuit S is unable to give a synchronism control signal to the digital PLL circuit. Then, the switch 41 is opened and the switch 42 is closed. The switches 41 and 42 constitute a gang switch. Then, the V/F converter 51 generates a pulse signal of a fixed frequency corresponding to a fixed bias signal $V_{ref}$. The inverter 1 is driven at a frequency determined by the number of pulses obtained by subtracting the pulse signal of the fixed frequency from the reference pulse signal.

Suppose that the frequency of the commercial power source is 50 Hz and the operating frequency of the inverter 1 is 50.01 Hz. Then, the frequency difference of the operating frequency of the controlled inverter 1 relative to the frequency of the commercial power source is expressed by:

$$\frac{50.01 - 50}{50} \times 100 = 0.02 \, (\%) \qquad (1)$$

Generally, the requisite frequency accuracy of an uninterruptible power supply is about ±0.1%, and hence the frequency accuracy of the inverter expressed by Expression (1), i.e., 0.02%, is not particularly unsatisfactory and such a frequency difference is insignificant.

Suppose that the phase difference at the start of the control of the inverter 1 is 360 degrees and the inverter 1 is operated at the above-mentioned inverter frequency. Then, a necessary phase following time is:

$$\frac{1}{50.01 - 50} = 100 \, (\text{sec}) \qquad (2)$$

FIGS. 4A and 4B are graphs showing the waveforms of the signals during the above-mentioned inverter control operation. In FIG. 4A, the time axis of the graphs are normalized by the period of the wave. In FIG. 4B, the time axis is scaled on second. FIG. 4B shows a mode of controlling the frequency of the inverter on the basis of the signal $V_{ref}$.

Referring to FIG. 4A, the voltage waveforms $V_I$ and $V_C$ (sinusoidal waves) of the main circuits are shaped in square waves. The voltage phase difference signal $\phi$ is the average of phase differences between the signals $V_{I1}$ and $V_{C1}$. When the output frequency of the inverter is controlled on the basis of the signal $V_{ref}$, it is considered that the voltage phase difference $\phi$ varies linearly as illustrated in FIG. 4B. The synchronism decision circuit 26 provides a synchronism detecting signal as shown in FIG. 4B, when the absolute value of the voltage phase difference signal $\phi$ decreases below a normal value.

According to the present invention, in addition to the synchronism control circuit S including the Schmitt trigger circuits 21 and 22, and the phase difference sensing circuit 23 a control amplifier 31 and a condenser 32 for synchronism control operation, a separate synchronism detecting circuit SC including Schmitt trigger circuits 24 and 25 and a synchronism decision circuit 26 is provided to detect the synchronism at a time $t_2$ and the power source is changed over uninterruptedly from the inverter to the commercial power. In this state, the malfunctioning circuit is repaired.

In this embodiment, the output of the V/F converter is changed with the bias signal.

As apparent from the foregoing description, according to the present invention, if the synchronism control unit malfunctions, the separate synchronism detecting circuit controls the switch automatically to apply a bias voltage to the V/F converter so that power of a fixed voltage frequency is supplied immediately. Therefore, the power source can be changed uninterruptedly from the inverter to the commercial power (reserve power source). Accordingly, adverse influences on the external circuits resulting from system down, such as the interruption or malfunction of load equipments caused by momentary interruption of power supply, is avoided, and hence the reliability of the power source is improved remarkably.

The maintenance, inspection and repair of the control circuit of a no-break power source or the like, in which service interruption should not occur, can be carried out without interrupting power source.

What is claimed is:

1. An inverter control circuit comprising:
   an inverter which is operated continuously to supply power to a load;
   a synchronism control circuit interposed between said inverter and a commercial power source;
   a PLL (phase locked loop) circuit is actuated via a control amplifier by a command given thereto by said synchronism control circuit so as to control said inverter;
   a first thyristor switch connected in series to said inverter and a second thyristor switch connected in series to said commercial power source;
   a synchronism detecting circuit connected in parallel to said synchronism control circuit;
   a switch controlled by said synchronism detecting circuit to change the output of said control amplifier with a bias signal when any fault has occurred in said synchronism control circuit.

2. An inverter control circuit according to claim 1, wherein said synchronism detecting circuit comprises waveform shaping circuits and a synchronism decision circuit, and said switch controlled by said synchronism detecting circuit is a gang switch operated by a command provided by said synchronism decision circuit in case said synchronism control circuit malfunctions, to apply a bias to said PLL circuit signal.

3. An inverter control circuit comprising:
   an inverter which is operated continuously to supply power to a load;
   a synchronism control circuit interposed between said inverter and a commercial power source;
   a PLL (phase locked loop) circuit which is actuated by a command given thereto by said synchronism control circuit;
   a first thyristor switch connected in series to said inverter and a second thyristor switch connected in series to said commercial power source;
   a synchronism detecting circuit connected in parallel to said synchronism control circuit;
   a control amplifier connected to said synchronism control circuit;
   said synchronism detecting circuit comprising waveform shaping circuits and a synchronism decision circuit; and
   a gang switch operated by a command provided by said synchronism decision circuit, in case said synchronism control circuit malfunctions, for applying a bias signal to change the output of said control amplifier.

* * * * *